April 12, 1949. J. J. DILKS 2,467,014
PICTURE VIEWING DEVICE
Filed Oct. 24, 1945
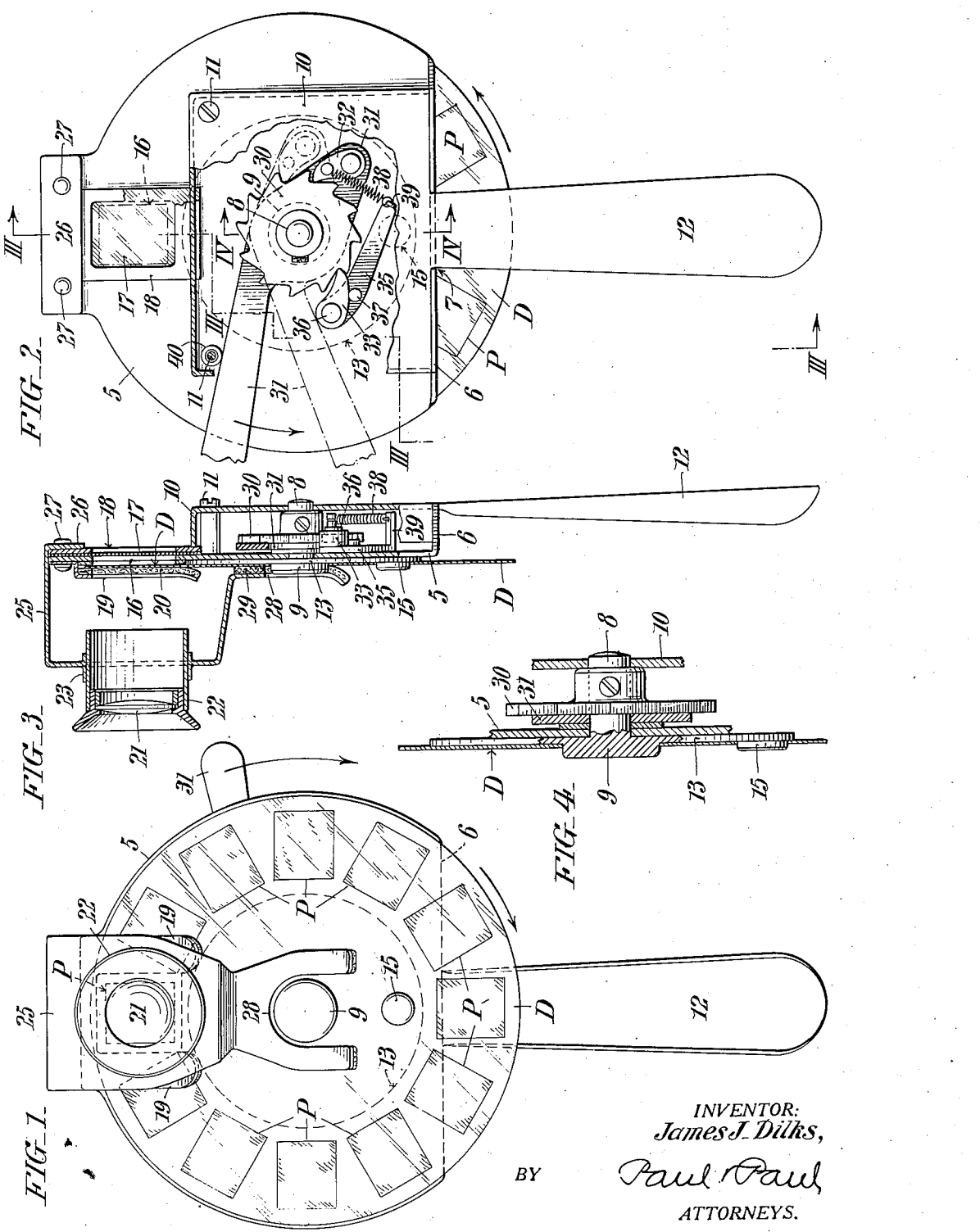
INVENTOR:
James J. Dilks,
BY Paul & Paul
ATTORNEYS.

Patented Apr. 12, 1949

2,467,014

UNITED STATES PATENT OFFICE 2,467,014

PICTURE VIEWING DEVICE

James J. Dilks, Haddon Heights, N. J.

Application October 24, 1945, Serial No. 624,196

5 Claims. (Cl. 40—71)

This invention relates to devices useful in viewing pictures, i. e., more particularly to pictures circularly arranged on disk films or like transparencies.

The aim of my invention is to provide a device of the kind referred to which is simple in construction; which lends itself to manufacture in quantity at small cost; which is operable to present the pictures individually and successively for viewing; and which permits ready and quick interchange of film disks.

How the foregoing and other advantages are realized in practice will appear from the following detailed description of the attached drawings, wherein Fig. 1 is a view in front elevation of a picture viewing device conveniently embodying my invention.

Fig. 2 shows the rear view of the device with portions broken out in section to expose important details which would be otherwise concealed.

Fig. 3 is a staggered vertical section of the device taken as approximately indicated by the angled arrows III—III in Fig. 2; and Fig. 4 is a fragmentary detail view in vertical section drawn to a larger scale and looking as indicated by the angled arrows IV—IV in Fig. 2.

As herein illustrated, my improved picture viewing device comprises a support 5 which is substantially circular in configuration and fashioned from sheet material, preferably metal, with a bottom segmental portion 6 thereof turned rearwardly at right angles for the purpose of forming a stiffening flange which is centrally notched as at 7. Passing axially through the support 5 is a stud shaft 8 with a head 9 at its front end and with its rear end rotatively supported in the rear wall of a rectangular housing component 10 likewise fashioned from sheet material and secured by screws 11 to the back of the support, said housing forming with said support and its flange 6, a complete enclosure. As shown, the housing component 10 has a pendant projection 12 which extends down through the notch 7 in the rearwardly turned segmental portion 6 of the support to serve as a grasp handle.

Secured to the stud shaft 8 directly behind its head 9 its a circular plate 13 which constitutes the rotative mounting for interchangeable disk films such as the one indicated at D having thereon a series of circumferentially-arranged pictures P. The film disk D is centrally apertured to snugly fit over the head 9 of the stud shaft 8 and also has an eccentric aperture to similarly fit over an eccentrically-disposed locating stud 15 on the mounting plate 13. As a consequence of this construction and arrangement, the film disk D is prevented from shifting rotatively relative to the mounting 13 incident to successive presentation of its individual pictures P, in a manner presently explained, at a window 16 in the support 5 above the housing 10, said window having a screen 17 of plain glass or transparent plastic held in place at the back of said support by a small aperture frame 18. At the region of the window 16, the disk film D is held to the front surface of the plate 13 by a clip element 19 lined across its top and down along its sides with padding of felt or the like 20 to bear directly against said disk.

In line with the window 16 in the support 5 is a viewing lens 21 the barrel 22 of which is axially adjustable in the flanged opening 23 of an overhanging arm-like sustaining projection 25, fashioned by stamping or otherwise from relatively stiff springy sheet metal. At its top the member 25 has a down-turned flange portion 26 through which it is permanently secured to the support 5 together with the glass retaining frame 18 and the clip 19, by means of rivets 27. The bottom end of the member 25 is moreover clevised as at 28 to straddle the head 9 of the stud shaft 8 and at that region lined with padding 29 to yieldingly bear against the film disk D and thus keep in place on the mounting 13.

The means provided for intermittently rotating the mounting includes a ratchet wheel 30 which is secured to the stud shaft 8 within the housing 10, and which has as many teeth as there are pictures P in the film disk D. Freely fulcrumed on the stud shaft 8 in the interval between the back of the support 5 and the ratchet wheel 30 is an actuating lever 31 which projects outward through a vertical slot in one end of the housing 10, and which carries a pawl 32 for engaging said ratchet. Also cooperative with the ratchet is a detent 33 for preventing retrogression of the disk mounting 13 after each rotative shift imparted thereto by the action of the pawl 32. As shown, the detent 33 is pivoted on a small underlying arm 35 which is fulcrumed on a stud 36 anchored in the support, said arm carrying a stop 37 for said detent. A helical tension spring 38 connected at one end to the pawl 32 and at the other end to an upstanding lug 39 on the stop arm 35, serves not only to maintain said pawl and said detent in yielding engagement with ratchet wheel 30, but to normally maintain the actuating lever in raised position against a stop indicated at 40.

In use, the device is grasped in one hand by the handle 12 and the disk intermittently rotated through downward movement of the actuating lever 31 by the other hand, so that the pictures on the film disk D are successively presented for viewing at the window 16 in the support in a manner readily understood from the drawings. The film disk may be removed from the device simply by springing back the lens supporting arm so to allow it to clear the head 9 of the stud shaft 8 and the locating stud 15 whereupon it can be slipped edgewise off its mounting. The mounting of a substitute disk is accomplished simply by reversing the above procedure which operation is facilitated by outward rounding of the ends of the bifurcation at the bottom of the projection 25 and of the clip element 19.

Thus, from the foregoing, it will be apparent that I have provided a viewing device for picture film disks which is not only free of complication, but which is easily operated and so constructed that it can be cheaply manufactured in quantity, and which moreover permits of ready and quick interchange of the disks.

Having thus described my invention, I claim:

1. A picture viewing device comprising a support; a rotative mounting in the form of a backing plate on the support for a film disk having circumferentially arranged pictures; means for preventing shifting of the film disk relative to the backing plate; means for intermittently rotating the plate for presentation of the pictures of the film disk successively at a window in said support; and retractable means connected to the support for yieldingly pressing said film disk to hold it in place on said plate.

2. A picture viewing device according to claim 1, wherein the support is provided with a single radially-extending elongate grasp handle.

3. A picture viewing device according to claim 1, wherein the means for intermittently rotating the film disk mounting includes a ratchet wheel, an actuating lever freely fulcrumed on the axis of the mounting and carrying a pawl for picking the ratchet wheel; and a detent on the support for holding the ratchet wheel against rotrogression in successively shifted positions.

4. A picture viewing device comprising a support; a rotative mounting on the support for a film disk having circumferentially arranged pictures; means for preventing shifting of the film disk relative to the mounting; means for intermittently rotating the mounting for presentation of the pictures of the film disk successively at a window in said support; a viewing lens; and an overhanging projection connected to the support for sustaining the lens in line with said window, and for keeping the film disk in place on the mounting.

5. A picture viewing device comprising a support; a stud shaft with bearing in said support; a mounting for a film disk with circumferentially arranged pictures secured to the stud shaft, said film disk having an axial aperture to fit over the end of said shaft; cooperative means for preventing shifting of the film disk relative to the mounting; means for intermittently rotating the mounting the presentation of the pictures of the film disk successively at a window in the support; and a retractable overhanging armlike projection connected to the support, said projection being springy and adapted to yieldingly press upon the disc film in the region of its center to keep it in position on said mounting.

JAMES J. DILKS.

REFERENCES CITED

The following references are of record in the file of this patent:

UNITED STATES PATENTS

| Number | Name | Date |
|---|---|---|
| 725,682 | Doeg | Apr. 21, 1903 |
| 2,189,285 | Gruber | Feb. 6, 1940 |